United States Patent [19]

Burns

[11] 4,287,116
[45] Sep. 1, 1981

[54] POLYESTER URETHANE-CONTAINING MOLDING COMPOSITIONS

[75] Inventor: Joseph P. Burns, Wilmington, Del.

[73] Assignee: ICI Americas Inc., Wilmington, Del.

[21] Appl. No.: 168,707

[22] Filed: Jul. 14, 1980

Related U.S. Application Data

[63] Continuation of Ser. No. 41,369, May 22, 1979.

[51] Int. Cl.$^3$ .................. C08L 67/06; C08L 75/06
[52] U.S. Cl. .................. 260/37 N; 260/45.85; 260/45.95 E; 525/28; 525/440; 525/455; 525/920
[58] Field of Search ............... 525/28, 440, 455, 920

[56] References Cited

U.S. PATENT DOCUMENTS

| | | | |
|---|---|---|---|
| 4,223,114 | 9/1980 | Suling | 525/440 |
| 4,233,424 | 11/1980 | Suling | 525/455 |

*Primary Examiner*—Paul Lieberman

[57] ABSTRACT

Polyester urethane derivatives having the following general formula:

$$c\text{-}i\text{-}(d\text{-}n)_t d\text{-}i\text{-}c$$

wherein d is a radical derived from an organic polyol; n is a radical derived from an unsaturated aliphatic dicarboxylic acid or an anhydride thereof; i is a radical derived from a polyisocyanate; c is a carbamyl-linked radical derived from a hydroxy-terminated ester of acrylic or methacrylic acid; t is an integer equal to from 1 to about 5; in ethylenically unsaturated monomer solutions are thickened to moldable non-sticky gels by the formation in said solution of minor amounts of branch chain polyurethane resin mixtures free of ethylenic unsaturation. The physical properties of reinforced molded articles made from these molding compositions show dramatic improvement in impact strength and flexibility.

21 Claims, No Drawings

POLYESTER URETHANE-CONTAINING MOLDING COMPOSITIONS

This is a continuation, of application Ser. No. 041,369 filed May 22, 1979.

BACKGROUND OF THE INVENTION

This invention is directed to blends of polyols, ethylenically unsaturated monomers and certain ethylenically unsaturated vinyl-terminated polyester urethane resins in homogeneous solution which can be thickened by the addition of polyisocyanates to form polyurethane gels which are tack-free within a few hours. It is also directed to gelled unsaturated monomer solutions of certain ethylenically unsaturated vinyl-terminated polyester urethane resins the gelling of which is obtained by employing mixed polyurethane resins free of ethylenic unsaturation as the gelling or thickening agent. Furthermore, it is directed to cured urethane resins of low profile or deep drawn reinforced components having a filler content as high as 80%. These fully-cured gelled compositions are surprisingly high in flexural and tensile strength, retain a higher tensile elongation, and have a higher impact resistance than previously known resins employing a dual curing system employing a polyurethane thickener free of ethylenic unsaturation. The molded compositions made from the resins of this invention, when mixed with glass and other fillers, pigments, peroxides, mold release agents, etc. can be converted into tractable, tack-free, handleable gels which can be cut into preforms and shaped by either injection or compression molding techniques into fully-cured articles such as plates and automobile bumpers having unusually high strength and flexibility.

PRIOR ART

Molding compositions employing ethylenically unsaturated polyester resin having unreacted carboxyl groups and vinylidene monomers have been thickened by the addition of inorganic materials, such as calcium or magnesium oxide. Gelation takes place rather slowly with the employment of these oxides and in some instances requires as much as two or three days to obtain a handleable or non-sticky sheet molding product. If not molded within a short period of time thereafter, they must be discarded since the gelation and cross-linking continues to a point where the composition is no longer tractable.

In recent years the automobile industry has been striving to reduce weight in newly manufactured vehicles as a means for increasing gas mileage. A most attractive way to reduce weight is to switch from metal to lightweight plastic components. However, plastics are inherently weak and must be highly reinforced to meet tensile strength requirements of certain components, such as wheels, brackets, structural panels, and bumpers. In order to meet the strength requirement resins must be reinforced with materials such as glass fiber filaments in high concentrations, mostly exceeding 50% by weight. Compositions having large amounts of filler, while producing very strong completely cured resins are difficult to mold into articles having uniformly distributed reinforcing materials. In producing molded articles having intricate shapes wherein a preform containing fiber filler is squeezed between male/female sections of a mold and the flowout exceeds 30%, it is difficult to obtain a uniformly filled article. Usually resin materials flow away from the fiber filler leaving the article more highly filled in the region of the preform and scantily filled or resin rich at the mold extremeties or locations of maximum flowout.

More recently, however, cross-linked polyurethane thickened gels of polyester resins have been developed which are an improvement over the metal oxide thickened materials in that they have increased stability and can be maturated to form moldable compositions within a few hours. Such systems after complete cure exhibit improved shrinkage characteristics over the cured metal oxide cross-linked and thickened materials. Both linear and branched polyurethane copolymers have been used for ethylenically unsaturated polyester resins and are described in U.S. Pat. Nos. 3,047,530; 3,290,208; 3,455,857; 3,464,935; 3,644,569; 3,700,752; 3,859,381; 3,868,431; 3,886,229; 3,893,956; 3,962,370; 3,994,764; 3,997,490; 4,062,826; 4,073,828; 4,086,203; 4,128,600; 4,129,641 and copending application of Ferrarini, et al. Ser. No. 928,690 filed July 27, 1978 now U.S. Pat. No. 4,232,133 which is commonly assigned.

The thickener system described in U.S. Pat. No. 3,700,752; 3,886,229; 4,062,826; and 4,086,203 and copending application Ser. No. 928,690 now U.S. Pat. No. 4,232,133 is somewhat similar to that of this application.

Vinylester urethane resins employed in this invention are described in U.S. Pat. No. 3,876,726 to Ford and commonly assigned application Ser. No. 927,461 to Ford filed July 24, 1978 now U.S. Pat. No. 4,182,830. It has now been discovered that when the above-described thickener systems are applied to the Ford resins the fully-cured items molded from such materials have unexpectedly high impact strength which permits their use in such critical items as automobile bumpers.

In extruding and molding conventional ethylenically unsaturated polyester resins, a high concentration of fiber glass reinforcing agent is required to produce a molded article having suitable strength. When large amounts of fiberglass are required the amount of thickener gel remaining is decreased and must be highly compatible with the fiberglass as well as the base resin such that the physical properties of the fully cured article is substantially uniform throughout. In the case of the present invention it has been found that the cured neat base resin and the polyurethane thickened base resin have substantially higher strength and uniformity. Within the combinations set forth in the present invention, physical properties such as elongation and impact strength provided by the vinyl ester urethane base resin are completely realized in molded articles and for reasons unknown provide much stronger articles.

It is an object therefore of the present invention to provide a novel blend of ethylenically unsaturated monomers and ethylenically unsaturated polyester urethane resin in solution with organic polyols which can be thickened by the addition of polyisocyanates to form tack-free molding compounds.

Another object is to provide a polyester urethane resin in a thickened composition which can be compression and injection molded to form articles having high impact strength when fully cured by addition polymerization.

The first of these objects can be accomplished by forming an ethylenically unsaturated monomer solution containing 30–70% by weight of vinyl ester urethane resins of the following general formula:

$$c\text{-}i\text{-}(d\text{-}n)_x d\text{-}i\text{-}c$$

wherein d is a radical derived from an organic polyol; n is a radical derived from an unsaturated aliphatic dicarboxylic acid or an anhydride thereof; i is a radical derived from a polyisocyanate; c is a carbamyl-linked radical derived from a hydroxy-terminated ester of acrylic or methacrylic acid; t is an integer equal to from 1 to about 5, and 1.5–20% by weight based on the total weight of said solution of a polyol free of ethylenic unsaturation having 2–50 carbon atoms.

The second of these objects can be accomplished by mixing with said solution a polyisocyanate free of ethylenic unsaturation to form a homogeneous tack-free handleable gel, and thereafter curing the combination by initiating polymerization between said ethylenically unsaturated monomer and vinyl ester urethane resin to form a product having high impact strength.

MOLDING COMPOSITIONS

In the practice of the invention to form a fully-cured article of the invention essentially three steps are taken:

1. Form an ethylenically unsaturated monomer solution having dissolved therein 30–70% by weight of the hereinafter described vinyl-terminated polyester urethane base resin having the following general formula:

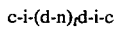

wherein d is a radical derived from an organic polyol; n is a radical derived from an unsaturated aliphatic dicarboxylic acid or an anhydride thereof; i is a radical derived from a polyisocyanate; c is a carbamyl-linked radical derived from a hydroxy-terminated ester of acrylic or methacrylic acid; t is an integer equal to from 1 to about 5, and add 1.5–20% by weight based on the total weight of said solution of an organic polyol polyurethane precurser.

2. Gel or thicken the monomer/vinylpolyesterurethane organic polyol solution by intermixing it with a polyisocyanate polyurethane precursor and catalyst with sufficient agitation to form a homogeneous mixture and thereafter permit gelation to form a handleable, non-sticky, tractable molding composition.

3. Mold the gelled tractable material and initiate copolymerization of ethylenically unsaturated monomer and resin to form the fully cured object.

VINYL ESTER URETHANES

Vinyl ester urethane resins are preferably prepared as described in U.S. Pat. No. 3,876,726 to Ford or copending application Ser. No. 927,461 to Ford, filed July 24, 1978 now U.S. Pat. No. 4,182,830, the teachings of which are hereby included by reference. These vinyl ester urethanes are condensates of a dihydroxy terminated polyoxyalkylene bisphenol. A maleate or fumarate, and a polyisocyanate which is further reacted with a hydroxyl-terminated ester of acrylic or methacrylic acid. In addition to or in place of polyoxyalkylene Bisphenol A fumarate or maleate may be employed unsaturated aliphatic polycarboxylic esters of aliphatic diols or triols, such as ethylene glycol, propylene glycol, butylene glycol, triethylene glycol, neopentyl glycol, 2,2,4-trimethyl-1,3 pentanediol, hexamethylene glycol, glycerine, and polyoxyalkylated derivatives of the same to name a few. Preferred polyols have a range of 2–50 carbon atoms. The amount of unsaturated aliphatic dicarboxylic acid or anhydride employed in the preparation of the hydroxy terminated ester derivatives should be such that the mol ratio of hydroxyl in the organic polyol to the carboxyl in acid or anhydride is equal to from about 2:1 to about 6:5.

Representative of polyoxyalkylene Bisphenol A derivatives maleates or fumarates of which may be employed include, for example: polyoxypropylene (2) Bisphenol A, polyoxyethylene (2.2) Bisphenol A, polyoxypropylene (2.2) tetrabromo Bisphenol A, polyoxypropylene (3) Bisphenol A, and polyoxypropylene (4) Bisphenol A.

The polyisocyanate used may be selected from diisocyanates, triisocyanates, and isocyanates having up to about 5 isocyanate groups per mol and/or mixtures thereof. Such aliphatic diisocyanates include, for example, methylene-bis (4-cyclohexyl isocyanate), and isophorone diisocyanate. Aromatic diisocyanates include toluene diisocyanate, diphenylmethane 4,4'-diisocyanate, p-phenylene diisocyanate, dichlorodiphenylmethane diisocyanate, dimethyldiphenylmethane diisocyanate, dibenzyl diisocyanate, diphenylether diisocyanate, and the like. For example, diisocyanates of the formula OCN-PH-X-PH-NCO, wherein PH is an aromatic ring and wherein X may be a valence bond or an alkylene radical containing 1 to 5 carbon atoms, or wherein X is oxygen, sulfur, sulfoxide, or sulfone are useful. When toluene diisocyanate is employed it includes a mixture of 2,4 and 2,6 isomers.

Polyfunctional isocyanates having an average isocyanate functionality of more than 2 such as polymethylene polyphenyl isocyanate are sold under the trademarks of RUBINATE M polyisocyanate and PAPI 901 polyisocyanate which have about 2.4–3 isocyanate groups per mol. These materials are sometimes referred to in the industry as crude MDI. Mixtures of diisocyanates and polyisocyanates can also be used.

The amount of diisocyanate or polyisocyanate employed should be equal to 1.8–2.4 mols of reactive isocyanate groups on said polyisocyanate per hydroxyl group in the hydroxy terminated ester derivative reacted therewith so that the product contains at least 2–4 isocyanate groups available for further conversion to the urethane derivatives.

The hydroxy terminated ester of acrylic or methacrylic acid which is used to form vinyl-terminated urethane resins may be prepared by reacting acrylic or methacrylic acid with an alkylene oxide selected from the group consisting of ethylene oxide and propylene oxide. The reaction is carried out by methods which are well-known in the art. Representative of materials which may be employed include, for example, hydroxypropyl methacrylate, hydroxyethyl methacrylate, hydroxyethyl acrylate, hydroxypropyl acrylate, polyoxyethylene (2) acrylate, polyoxyethylene (2) methacrylate, polyoxyethylene (3) acrylate, polyoxyethylene (3) methacrylate, polyoxypropylene (2) acrylate, polyoxypropylene (2) methacrylate, polyoxypropylene (3) acrylate and polyoxypropylene (3) methacrylate.

The amount of acrylate or methacrylate employed should be equal to at least one mol per mol of unreacted isocyanate group in said above described —NCO terminated polyester polyisocyanate reaction product.

Typical polyvinyl ester urethane resins are made according to the following procedures:

Preparation A—Polyester Urethane Resin

Into a two liter reaction flask equipped with a stirrer, thermometer, nitrogen inlet tube and distillation head there is added 4 mols of polyoxypropylene bisphenol A containing an average of 2.2 mols of propylene oxide per mol of bisphenol A and 2 mols of maleic anhydride. The resulting reaction mixture is heated to between 210°–215° C. 1 mol of the diester which results is further reacted in the presence of 1.44 grams of hydroquinone, by heating to 80° C. with 2 mols of hydroxy-propylmethacrylate and 2 mols of toluene diisocyanate and mixing for a period of 1 hour. The reaction mixture is permitted to rise to a temperature of 135° C. and held at that point for ½ hour. The resultant light colored solid has a melting point of 97° C., an acid number of 7.6, a saponification number of 201, a hydroxyl number of 22, and no residual unreacted isocyanate. The resulting resin is ground to a white finely divided powder and dissolved in styrene to form a 50% solids containing solution.

Preparation B—Polyester Urethane Resin

According to the procedure of Example A, 4 mols of polyoxypropylene bisphenol A containing an average of 6 mols of propylene oxide per mol of bisphenol A and 2 mols of maleic anhydride are reacted and thereafter condensed with a mixture containing 2 molar equivalents of toluene diisocyanate and 2 mols of hydroxyethyl acrylate.

Preparation C—Polyester Urethane Resin

According to the procedure of Example A, 4 mols of polyoxypropylene bisphenol A containing an average of 16 mols of propylene oxide per mol of bisphenol A and 2 mols of maleic anhydride are condensed to form a polyester urethane and thereafter reacted with a mixture containing 2 molar proportions of toluene diisocyanate and hydroxyethyl acrylate per mol of polyester.

Preparation D—Polyester Urethane Resin

According to the procedure as outlined in Example A, a two molar portion of polyoxyethylene bisphenol A having an average of 6 mols of ethylene oxide per mol of bisphenol A and a 1 molar equivalent of maleic anhydride are condensed and thereafter reacted with a mixture containing 2 mols of toluene diisocyanate and 2 mols of hydroxypropyl methacrylate.

Preparation E—Polyester Urethane Resin

A two molar portion of polyoxypropylene bisphenol A having an average of 6 mols of propylene oxide per mol of bisphenol A is reacted with a molar portion of maleic anhydride as described in Example A. 2.7 mols of this diester maleate is then reacted with a mixture of polyisocyanate having an average functionality of 2.7 isocyanate groups per mol which may be considered as a mixture of 4,4'diphenylmethane diisocyanates and other polyisocyanates sold under the trademark Rubinate M is reacted in admixture with 2.7 mols hydroxypropyl acrylate until the resin is free of unreacted isocyanate groups.

Preparation F—Polyester Urethane Resin

According to the procedure as outlined in Example A, a diester prepared by condensing a two molar portion of hexanediol with one molar portion of maleic anhydride is thereafter reacted with a two molar portion of toluene diisocyanate and a two molar portion of hydroxyethyl acrylate. This material is dissolved in styrene to prepare a 70% resin-in-monomer solution.

Preparation G—Polyester Urethane Resin

According to the procedure as outlined in Example A, a two molar portion of triethylene glycol is condensed with a one molar portion of maleic anhydride and thereafter reacted with a two molar portion of toluene diisocyanate and a two molar equivalent of hydroxyethyl acrylate. This material is dissolved in styrene to form a 70% resin-in-monomer solution.

Preparation H—Polyester Urethane Resin

According to the procedure as outlined in Example A, a two molar portion of neopentylglycol is condensed with a one molar portion of maleic anhydride and thereafter reacted with a two molar portion of toluene diisocyanate and a two molar equivalent of hydroxyethyl acrylate. This material is dissolved in styrene to form a 70% resin-in-monomer solution.

Preparation I—Polyester Urethane Resin

According to the procedure as outlined in Example A, a two molar portion of 2,2,4-trimethyl-1,3-pentanediol is condensed with a one molar portion of maleic anhydride and thereafter reacted with a two molar equivalent of toluene diisocyanate and a two molar equivalent of hydroxyethyl acrylate. This material is dissolved in styrene to form a 70% resin-in-monomer solution.

Preparation J—Polyester Urethane Resin

Into a reactor equipped with a stirrer, thermometer and dry air inlet tube were added 0.358 gram mols of a hydroxy- terminated polyester oligomer formed by reacting 4 molar equivalents of polyoxypropylene (2.2) bisphenol A with 2 molar portions of maleic anhydride, heated to 80° C. with 182 grams of styrene and 190 grams (1.22 mols) of 94% hydroxypropyl methacrylate after which the temperature dropped to 45° C. At this point 255 grams (0.717 mols) of RUBINATE M a crude polymethylene polyphenyl isocyanate having 2.7 mols-NCO grams per mol were added dropwise causing the temperture to rise to about 79° C. The temperature of the mixture was raised to 90°–95° C. and held for 5 hours after which point no detectable amount of free-NCO groups could be found by infra-red analysis. Additional styrene was added to yield a 50% solid styrene solution. This resin-styrene solution has a viscosity of 380 cps (No. 2 spindle in Brookfield at 30 rpm) at room temperature. The resin styrene solution has an acid number of 2.8, a saponification number of 101 and a hydroxyl number of 5.8.

ETHYLENICALLY UNSATURATED MONOMERS

Ethylenically unsaturated monomers may be selected from styrene, vinyltoluene, divinylbenzene, acrylic acid esters, methacrylic acid esters, such as methylacrylate, ethylacrylate, n-butylacrylate, 2-ethylhexyl acrylate, methyl methacrylate, pentaerythritol triacrylate, ethylene glycol dimethacrylate, diallylphthalate, diallylmaleate, diallylfumarate, triallylcyanurate, vinylacetate, vinylpropionate, divinylether, acrylonitrile, butadiene, and the like. In general, by vinyl monomers is meant a monomer containing at least one ethylenically unsaturated group which will react with the ethylenically unsaturated group in a polyester or itself.

The proportion of vinyl monomer or monomers in the solution may be in the range of 30-70% and preferably in the range of 40-60% by weight.

ORGANIC POLYOL POLYURETHANE THICKENER PRECURSOR

The organic polyols for polyurethane thickening include saturated (free of ethylenic unsaturation) glycols, triols and in some instances mixtures of diols, triols and polyols having up to 6 hydroxyl groups per molecule. Suitable saturated organic polyols include, for example, ethylene glycol, propylene glycol, butane 1-4 diol, pentane 1-5 diol, hexane 1-6 diol, diethylene glycol, polybutylene glycol neopentylglycol, dipropylene glycols, polyethylene glycols, and polypropylene glycols. Trifunctional or even higher functionality polyols include, for example, glycerol, pentaerythritol, trialkylolalkanes, such as trimethylol propane, triethylol propane, tributylol propane, and alkoxylated derivatives especially those of lower molecular weight of said polyalkylol materials, for example, oxyethylated trimethylol propane, oxypropylated trimethylol propane, oxyalkylated glycerol, such as oxypropylated derivatives of glycerol especially those derivatives of low molecular weight. Similar derivatives of higher hydroxy group containing compounds, such as sorbitol, mannitol can also be employed.

It is preferred that polyols used in the polyurethane reaction be free of ethylenic unsaturation. However, aromatic materials having two or more hydroxyl groups are particularly useful. In particular derivatives of bisphenol A and their polyalkoxylated derivatives, such as reaction products of bisphenol A with 2-20 mols of propylene oxide or ethylene oxide having found to be most preferred. Representative of these bisphenol A derivatives are, for example, polyoxypropylene (2.2) bisphenol A, polyoxyethylene (2.2) bisphenol A, polyoxypropylene (2.2) tetrabromo bisphenol A, polyoxypropylene (3) bisphenol A, and polyoxypropylene (4) bisphenol A, polyoxypropylene (6) bisphenol A, and polyoxypropylene (9) bisphenol A.

Saturated polyols also include saturated polyesters having at least two hydroxyl groups available for reactivity with isocyanate groups in the polyurethane reaction. Such polyesters are condensates of saturated acids with saturated polyols free of ethylenic unsaturation but including aromatic unsaturation. The above described polyols from condensates with diacids such as adipic, sebacic, glutaric, isophthalic, phthalic, and terephthalic acids to name a few.

POLYISOCYANATE POLYURETHANE THICKENER PRECURSOR

The polyisocyanates used in the formation of the polyurethane thickener may be bi-functional or tri-functional or even higher up to as many as six isocyanate groups per mol. The polyisocyanate may be aliphatic, cyclo-aliphatic or aromatic or may contain, in the same polyisocyanate molecule, aliphatic and aromatic isocyanate groups, aliphatic and cyclo-aliphatic groups, and aromatic isocyanate groups, aliphatic and cyclo-aliphatic isocyanate groups, cyclo-aliphatic and aromatic isocyanate aliphatic cyclo-aliphatic and aromatic isocyanate groups. The desired mixtures of two or more different polyisocyanates may be employed.

Examples of suitable polyisocyanates include 4,4'-diphenylmethane diisocyanate, 2,4- and 2,6-toluene diisocyanate and mixtures thereof, isophorone diisocyanate, tetramethylene diisocyanate, pentamethylene diisocyanate, hexamethylene diisocyanate and 4,4'-dicyclohexylmethane diisocyanate. Particularly useful is polymethylene polyphenyl isocyanate which comprises a mixture having 2-6 isocyanate groups per molecule and which has a functionality averaging between 2.1 and 3 isocyanate groups per mol and most often 2.3-2.7 isocyanate groups per mol and is sometimes referred to in the art as crude MDI.

The mol ratio of -NCO groups on the polyisocyanate polyurethane precursor to the hydroxyl groups on organic polyol polyurethane precursor when mixed for the purpose of thickening the polyester urethane base resin should be controlled within a range of about 0.4-1.6 mol -NCO/mol OH.

A homogeneous mixture containing a vinylidene monomer solution of the polyester urethane resin and the polyol is prepared by mixing them at room temperature. Into this polyol/resin/vinyl monomer solution are dissolved catalysts such as a urethane or carbamate promoter, and free-radical initiators. Optional reinforcing materials, filters, accelerators, stabilizers, antioxidants, mold-release agents, and dyes may also be incorporated. Into this mixture is added the polyisocyanate with appropriate agitation so that a mixture of the reactants, fillers and catalysts is maintained during gelation. Reaction usually takes place such that the temperature is kept below the activation point of the free-radical initiator catalyst. The catalyst and the temperature of the solution may be controlled such that gellation occurs within a period as short as one minute and as long as twenty-four hours. In the most rapid gelling system, the filler should be added well in advance of the addition of the polyisocyanates so that adequate wetting takes place. In the practice of the invention, however, there is very little need for raising the temperature of the polyol solution prior to the addition of polyisocyanates because in most instances the reaction between the polyol and polyisocyanate takes place to form urethanes at atmospheric temperature to form a dry putty-like composition in less than about three hours. Since the polyester urethane resin may contain unreacted isocyanate groups, cross-linking between the urethane thickener and the resin may take place by the formation of urethane or isocyanurate linkages to a minor extent. Usually it is easily handleable and shapable by injection or compression molding techniques.

By selection of suitable catalysts and temperatures, the polymerization of the gelled resin/monomer solution may be carried out in several sequences. For example, the polyurethane thickening precursor may be fully reacted prior to any substantial reaction between the ethylenically unsaturated monomer and polyester urethane resin. Alternatively, the polyester urethane resin may be partially reacted with the ethylenically unsaturated monomer before any substantial reaction between the urethane thickening precursor has taken place. Furthermore, conditions and catalysts may be chosen such that the isocyanate/polyol reaction takes place simultaneously with the additional reaction of the polyester urethane resin with the ethylenically unsaturated monomer.

Suitable catalyst for carrying out the urethane formation of step 1 of the above process in addition to copper salt, are: organo-metallic compounds of tin, zinc, lead, mercury, cadmium, bismuth, cobalt, manganese, antimony, iron and the like such as, for example, metal salts of carboxylic acids having from about 2 to about 20 carbon atoms including, for example, stannous octoate, dibutyl tin dilaurate, dibutyl tin diacetate, ferric acetyl acetonate, lead octoate, lead oleate, cobalt naphthanate, lead naphthanate, mixtures thereof and the like. It is preferred that the catalysts be employed in liquid form. Those catalysts which are not ordinarily liquids may be added as a solution in solvent.

Reaction between the polyester urethane resin and the monomer is usually activated by the presence of a catalyst, for example, a peroxide like benzoyl peroxide, tertiary butyl perbenzoate and 1,1-bis(t-butyl peroxy) 3,3,5-trimethylcyclohexane, to name a few. Some of these catalysts react at low temperatures to initiate free-radicals while others are activated at high temperatures in the presence of an accelerator, such as a dilute solution of a cobalt soap or an amine. The selection of the free-radical catalyst is important if one is to control the time at which the addition polymerization takes place. It is contemplated that light activated free-radical catalysts may also be used if lower temperatures are preferred. In the performance of the present invention, it is preferred that the addition polymerization between the polyester urethane resin and the ethylenically unsaturated monomer takes place within the mold at temperature of the mold.

Suitable shaping methods include casting and compression molding. For example, a shaped article may be produced by charging the components of the mixture into a suitable mold in which they are first gel polymerized to form what is often referred to as a preform. The mixture may also be compressed during gel polymerization.

It has been found that the initially shaped gel or preform of the invention may also be further shaped when the components of the mixture are in a partially gelled or completely gel polymerized state which comprises first, forming a tractable shape of simple profile formed before the system becomes completely gel polymerized or before or while the ethylenically unsaturated monomer/vinyl ester urethane resin polymerization begins as previously described; and causing or allowing the thus preshaped gel to retain its shape while completing the gelation and addition polymerization.

The preshaping process of the invention may be effective on any suitably shaped, partially gel polymerized form of simple profile which may, if desired, contain fibrous reinforcement. It can so be adapted to the preshaping of a partially gel polymerized article in the form of a sheet or pellets. The preshaping may be effected, for example, by causing the preform of simple profile to form to the contours of a mold, for example, by mechanical or vacuum means or by a combination thereof. The shaped article of simple profile such as a sheet, may be shaped, for example, by pressing between the cooperating parts of a mold or by draping over a vacuum molding device.

In many instances, a preshaped or preformed article may be moved from the mold after the thickening of gellation reaction has taken place and before the addition polymerization has substantially started. If the gel polymerized article does not retain its shape, the addition polymerization may be started while the article is in the preform mold to increase its rigidity and thereafter the article can be removed from the preform mold and injected quickly into another mold, thereby retaining a final shape while both reactions are going to completion. Furthermore, the original liquid monomer solution may be thickened by the resultant effect of the polyol/polyisocyanate reaction to form urethane or isocyanurate linkages and the simultaneous addition polymerization such that thickening takes place as a result of two independent and separate polymer chain formations. Reaction conditions can be established by experimental trial with catalyst, resin ingredients, fillers, internal mold release agents such as stearates, coupling agents and accelerators.

The properties of the shaped articles of the invention, such as the flexural and notched impact strength are improved by incorporating fibrous reinforcing materials either prior to or after gelation and before the addition polymerization reaction has been completed. The fibrous materials may be, for example, glass fiber, graphite fiber, asbestos fiber, or fibrous materials derived from well-known organic polymers. These fibrous materials may be in any suitable form, for example, in the form of cloth, a matte, ribbon, tapes, chopped staple filaments or as loosely woven veils. Furthermore, they may range in length from fibrids to continuous filaments. Usually glass fibers in the range of 1-5 cms. in length are used. The amount of fibrous material to be incorporated will depend upon the desired improvement in the strength desired of the shaped article. In general, from 5 to 80% based on the total weight of the shaped article is sufficient. Where it is desirable to affect a substantial improvement in strength properties, 60–80% by weight of reinforcing agent may be required.

In addition to the fibrous materials, other fillers, such as carbon black, clay, iron oxide, lithopone, mica, silica other silaceous materials, and titanium dioxide, calcium carbonate and colored pigments may be added at some convenient time during the intermixing and preparation of the gellation precursers.

The invention can be understood by the illustrations in the following examples in which parts are expressed as parts by weight.

EXAMPLES 1–5

Polyesterurethane/vinylmonomer/polyol blends are prepared in an atmosphere relatively free of oxygen in conventional mixing equipment equipped with an agitator. In proportions shown in Table I, polyester urethane base resins in styrene solutions as prepared in Preparation A through J are blended with varying quantities of polyol polyurethane precurser and mixed with varying amounts of stabilizer, peroxide catalyst, polyurethane catalyst and internal mold release agents. These blends are particularly valuable in that they can be stored without gelation and can be used in combination with many fillers and reinforcing agents to prepare thickened molding compounds when mixed with polyisocyanates.

EXAMPLES 6–13

The polyesterurethane/styrene/polyol blends of Examples 1–5 are gelled without fillers in Examples 6–9, with 2.5–3 cms. long chopped glass fibers in Examples 11–13; and with $CaCO_3$ in Example 10 by the addition of polymethylene polyphenyl isocyanate having 2.7 isocyanate groups per mol (commercially available from Rubicon Chemicals Inc. as RUBINATE M) and thereafter a 500 gram portion of this mix is placed into a 25 cm. square mold and permitted to gel at room temperature. The material becomes a rubbery, pliable tack-free preform. Ingredient weights, ratios, and gel times are listed in Table II.

After five days the preform is cut into four equal squares, stacked one above the other and then placed in the center of a 28 cm. square flat mold and pressed between two flat plates at 405 psi at 140° C. for a period of 5 minutes to form a 3 mm thick sheet. The ratio of the ingredients and physical properties of these fully-cured sheets are found in Tables II and III. Test procedures were carried out according to standard procedures outlined by the American Soc. for Testing Material (ASTM) Test Nos. D256; D638 and D790.

As a means for demonstrating the improvements offered by the compositions of the invention, a conventional isophthalate polyester resin prepared by condensing isophthalic acid, fumaric acid, with equal molar amounts of propylene glycol was thickened and tested as described above for compositions and listed in Column 1 of Table IV. Such compositions are represented in U.S. Pat. No. 4,062,826, Example 19 in particular.

A more recently discovered polyisocyanurate resin, more completely described in copending U.S. applications Ser. No. 819,352 now U.S. Pat. Nos. 4,128,537 and 819,353 now U.S. Pat. No. 4,195,146 to Markiewitz et al. and thickened according to procedures outlined in copending U.S. application Ser. No. 928,690 now U.S. Pat. No. 4,232,133 to Ferrarini et al. and which is a polyisocyanurate resin prepared by condensing hydroxypropyl methacrylate, in a styrene solvent in the presence of N-benzyl trimethyl ammonium hydroxide trimerization catalyst was tested for the purpose of comparison. The polyisocyanurate resin formed thereby has a molecular weight from below 5200 to below about 26,000 and has an average of 10 isocyanurate rings per mol. Resin solutions containing 30-70% monomer are thickened with certain polyols having a molecular weight in the range of 300-2,000 and polyisocyanates having 2.7 isocyanate groups per mol. Properties are listed in column 2 Table IV.

The results tested in Table IV indicate that unlike the polyester and polyisocyanurate resins, the physical properties of the polyurethane thickened and cured polyvinyl ester urethane resin retains its neat resin physical properties. The tests were carried out by casting 50% resin in styrene solutions containing 1% peroxide and 1% dibutyl tin dilaurate catalysts between glass plates as described previously at temperatures of 60° C. for 16 hours, 100° C. for 2 hours, and 150° C. for 1 hour. As seen in column 3 Table IV, the urethane thickened resin of the invention retains nearly identical properties with the neat styrene/vinyl maleate urethane base resin copolymer. This unique feature provides a casting which has a uniformly high resin strength throughout; an unusual advantage in preparing parts requiring high impact strength such as is needed for certain automobile components.

IMPACT TESTING OF AUTOMOBILE BUMPERS

Automobile bumper parts were constructed from the resins described above in column 1 and column 2 of Table IV and Example 13, having 65% by weight 2.6 cms fiberglass reinforcement and tested for resistance to impact damage when assembled and affixed to the front bumper mounting of a 1979 mass produced automobile. Each bumper consists of 3 pieces: the front elongated box Section, an intermediate "W" shaped truss reinforcing section adhesively bonded to the interior of said box section, and an adhesively mounted back section for mounting to the auto frame.

Each part was substantially of similar dimension to that for each of the test materials but differed in weight slightly because of the differences in the base resins. The total weight for each bumper was found to be less than 15 pounds. Bonding and testing was performed by Autodynamics Corporation of America according to standard tests as described by the U.S. Department of Transportation. Such tests require that the bumper withstand the impact of a car (weight of 3,350 pounds) traveling at 5.2 miles per hour. The test is run by loading a pendulum to the described weight then raising it to a level such that when it is released and swings down it is traveling at 5.2 miles per hour when it strikes the bumper. Surprisingly even when the pendulum was loaded at 5,000 and 5,400 pounds and moving at speeds up to 6.2 miles per hour the materials of the invention remained intact. In Table V is summarized the results of the impact test at the center line point (Lc) the outboard high point (OB hi), the weight of the pendulum, and speed of impact. The Table indicates that the outboard mode of impact is more severe than the center line mode for the particular bumper design tested. It is further seen that the materials of the invention suffered no damage from the outboard or center line mode of impact at pendulum loadings of up to as high as 5,000 pounds. After six impacts with 5,400 pounds the bumper appeared slightly crazed. Resin bumpers of column 1 and column 2 were either crazed or cracked at 3,350 pounds or 5,000 pounds when struck while the material of the invention was slightly crazed in the outboard region at 6.2 miles/hr. impact and not damaged otherwise.

TABLE I

| POLYESTER URETHANE/STYRENE/POLYOL BLENDS | | | | | |
|---|---|---|---|---|---|
| Ingredients | Ex. 1 | Ex. 2 | Ex. 3 | Ex. 4 | Ex. 5 |
| | (Parts by wt.) | | | | |
| Preparation A-50% Styrene | 90 | 80 | 70 | — | — |
| Preparation J-50% Styrene | — | — | — | 80 | 76 |
| Styrene | — | — | — | 4 | 14 |
| Polyoxypropylene(2.2) bisphenol A | 5.06 | 11.45 | 22.11 | 0.45 | 0.45 |
| Polyoxyethylene(2.2) bisphenol A | — | — | — | 4.05 | 4.05 |
| Hydroquinone(10% Soln) (Stabilizer) | 0.5 | 0.5 | 0.5 | — | — |
| Toluhydroquinone (Stabilizer) | — | — | — | 0.35 | 0.35 |
| Tert-butyl Peroxide (Free Radical Initiator Catalyst) | 1.2 | 1.2 | 1.2 | — | — |
| 1,1-di-t-butyl Peroxy-3,3,5 Trimethyl Cyclohexane (Free Radical Initiator) | — | — | — | 1.0 | 1.0 |
| Dibutyl Tin Dilaurate Urethane Promotor Cat.) | 2.5 | 2.5 | 2.5 | 0.6 | 0.2 |
| Triethlamine (Urethane Promotor Cat.) | — | — | — | 0.3 | 0.3 |

TABLE II

| MOLDING COMPOSITIONS - EXAMPLES 6-10 | | | | | |
|---|---|---|---|---|---|
| Ingredients | Ex. 6 | Ex. 7 | Ex. 8 | Ex. 9 | Ex. 10 |
| | (Parts by wt.) | | | | |
| Example 1 | 100 | — | — | — | — |
| Example 2 | — | 100 | — | — | — |
| Example 3 | — | — | 100 | — | — |
| Example 4 | — | — | — | 97 | — |
| Example 5 | — | — | — | — | 97 |
| Polymethylene polyphenyl polyisocyanate-2.7 NCO/Mol | 4.94 | 7.29 | 7.89 | 5.5 | 5.5 |
| Zinc Stearate (mold release agent) | — | — | — | 3.0 | 3.0 |
| CaCO₃ (filler) | — | — | — | — | 85 |
| Tack-free Gel Time | 60 | 60 | 60 | — | — |

TABLE II-continued

MOLDING COMPOSITIONS - EXAMPLES 6-10

| Ingredients | Ex. 6 | Ex. 7 | Ex. 8 | Ex. 9 | Ex. 10 |
|---|---|---|---|---|---|
| | (Parts by wt.) | | | | |
| (Min.) | | | | | |
| Time to 100,000 cps (Min.) | — | — | — | 90 | 104 |
| % Urethane Thickener | 10 | 20 | 30 | 10 | 10 |
| NCO/OH Mol Ratio | 1.25/1 | 0.82/1 | 0.46/1 | 1.45/1 | 1.45/1 |

TABLE III

FIBERGLASS REINFORCED SHEET MOLDING COMPOUNDS

| Ingredient/Property | Example 11 | Example 12 | Example 13 |
|---|---|---|---|
| Short Beam Shear at 25° C.[4] psi | 6,000 | 5,380 | 5,850 |
| Short Beam Shear at 92° C. psi | 3,040 | 2,730 | 3,140 |
| Tensile Impact Total Energy[5] ft. lb/sq. in. | 190 | 230 | 276 |
| Force at fracture ft. lbs. | 6,300 | 6,380 | 5,720 |
| Energy at fracture ft. lbs./sq. in. | 17 | 22 | 22 |

[1]ASTM D-790
[2]ASTM D-638
[3]ASTM D-256
[4]ASTM D-2344
[5]ASTM D-1822

TABLE IV

PROPERTIES OF CONVENTIONAL CASTINGS (NOT REINFORCED)

| | 1 Isophthalic Polyester/Styrene | | 2 Styrene/ Polyisocyanurate | | 3 Preparation J | |
|---|---|---|---|---|---|---|
| | Neat Resin | Urethane Thickened | Neat Resin | Urethane Thickened | Neat Resin | Urethane Thickened |
| Flex. Str. (psi)[1] | 13800 | 17600 | 14800 | 21100 | 22700 | 25200 |
| Flex. Mod. (10⁶ psi) | 0.52 | 0.53 | 0.54 | 0.58 | 0.47 | 0.48 |
| Ten. Str. (psi)[2] | 8900 | 10200 | 6900 | 8100 | 13300 | 13400 |
| Ten. Mod. (10⁶ psi) | 0.53 | 0.53 | 0.64 | 0.59 | 0.53 | 0.51 |
| Elongation (%)[5] | 2.02 | 2.44 | 1.47 | 2.20 | 4.33 | 7.10 |
| Barcol Hardness[3] | 44-46 | 44-46 | 47-48 | 46-48 | 36-40 | 35-40 |
| Heat Distortion Temp. (°C.)[4] | 133 | 116 | 149 | 149 | 133 | 119 |
| Charpy Impact[5] ft. lbs/in. | 2.44 | 3.25 | 2.92 | 3.40 | 5.99 | 6.16 |

[1]ASTM D-790
[2]ASTM D-638
[3]ASTM D-2583
[4]ASTM D-648
[5]ASTM D-256

TABLE V

IMPACT TESTING OF AUTOMOBILE BUMPERS

| Autodynamic Test Results | 1 Isophthalic Polyester | | 2 Polyisocyanurate | | 3 Preparation J | |
|---|---|---|---|---|---|---|
| | Run A | Run B | Run A | Run B | Run A | Run B |
| Wt. of Molded Parts (lbs.) | 13.11 | 12.37 | 12.34 | 12.34 | 12.68 | 12.80 |
| Wt. of Molded Parts & Adhesive | 15.37 | 14.50 | 14.62 | 14.62 | 14.56 | 14.87 |
| Impact Test | | | | | | |
| Pendulum Weight (lbs) | 3350 | 5000 | 3350 | 3350-5000 | 3390 | 5000-5400 |
| Pendulum Speed (Mph) | 5.2 | 5.2-5.6 | 5.2 | 5.2 | 5.2 | 5.2-6.2 |
| Kinetic Energy (ft. lbs) | 3039 | 4537-5261 | 3039 | 3039-4537 | 3039 | 4537-6965 |
| Peak Force (lbs) | 17300 | 14500-16400 | 7500 | 12200-13000 | 13000 | 14000-17100 |
| Energy Absorbed (ft. lbs) | — | — | — | 473-496 | 453-570 | 452-833 |
| Impact Area | | | | | | |
| Hi Outboard | Crazed | | Crazed | | No damage | Crazed |
| Center line | | Cracked | | No damage | No damage | No damage |

| Preparation J | | | |
|---|---|---|---|
| Soln. (%) | 92 | 90 | 90 |
| Urethane Thickener (%) | 8 | 10 | 10 |
| Triethyl Amine Catalyst (pHR) | 1 | 0.5 | 0.5 |
| Peroxide Catalyst (pHR) | 1 | 1 | 1 |
| Handleability | Good | Good | Good |
| Fiberglass (%) | 58.2 | 66.2 | 67.7 |
| Flex Strength (psi) at 25° C.[1] | 68,000 | 71,200 | 70,600 |
| Flex Modulus (10⁶ psi) at 25° C. | 2.1 | 2.2 | 2.2 |
| Flex Strength (psi) at 92° C.[1] | — | 39,500 | 47,200 |
| Flex Modulus (10⁶ psi) at 92° C. | — | 1.4 | 1.7 |
| Tensile Strength (psi) at 25° C.[2] | 38,000 | 40,800 | 43,500 |
| Tensile Modulus (10⁶ psi) at 25° C. | 2.2 | 2.4 | 2.8 |
| Tensile Strength (psi) at 150° C.[2] | 13,500 | 12,600 | 19,500 |
| Tensile Modulus (10⁶ psi) at 150° C. | 1.1 | 1.0 | 1.2 |
| Izod Impact Strength-Notched[3] ft. lbs/in. | 31 | 31 | 31 |

What is claimed is:

1. A homogeneous solution of a vinylidene monomer and an acrylated polyester urethane resin useful in preparing injection and compression molding compositions by the reaction therewith of polyisocyanates to form polyurethane containing vinyl copolymers which comprises an ethylenically unsaturated monomer solution having dissolved therein:

(A) 30–70% by weight of a resin selected from a vinyl ester urethane having the following general formula:

$$c\text{-}i\text{-}(d\text{-}n)_r d\text{-}i\text{-}c$$

wherein d is a radical derived from an organic polyol; n is a radical derived from an unsaturated aliphatic dicarboxylic acid or an anhydride thereof; i is a radical derived from polyisocyanate; c is a carbamyl-linked radical derived from a hydroxy-terminated ester of acrylic or methacrylic acids; t is an integer equal to from 1 to about 5, and (B) 1.5–30% by weight of at least one organic polyol free of ethylenic unsaturation having 2–6 hydroxyl groups per molecule and which is the essential polyurethane precursor reactive with said polyisocyanate to form polyurethane.

2. A composition of claim 1 wherein said vinylester urethane resin is a product having the following general formula:

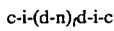

wherein d is a radical derived from polyalkoxylated bisphenol A compounds, n is a radical derived from an unsaturated aliphatic dicarboxylic acid or an anhydride thereof; i is a radical derived from a polyisocyanate; c is a carbamyl-linked radical derived from a hydroxy-terminated ester of acrylic or methacrylic acid; t is an integer equal to from 1 to about 5.

3. A composition of claim 2 wherein said vinylester urethane resin is a condensation product of polyoxyalkylene bisphenol A having 2–16 mols of ethylene oxide or propylene oxide per mol, n is derived from maleic anhydride or maleic acid, i is a radical derived from a group select from toluene diisocyanate or a polyisocyanate having 2.4–3 isocyanate groups per mol.

4. A composition of claim 1 wherein said ethylenically unsaturated monomer is selected from the group consisting of styrene, ethylacrylate, propylacrylate, isopropylacrylate, hexanediol diacrylate, 2 ethylhexyl acrylate, 2 ethylhexyl methacrylate, butyl acrylate, butyl methacrylate, neopentyldiol dimethacrylate, pentaerythritol triacrylate, pentaerythritol trimethacrylate, vinyl toluene, divinyl benzene, and triallyl isocyanurate, vinyl acetate, diallyl fumarate, divinyl ether and acrylonitrile.

5. A composition of claim 1 wherein said ethylenically unsaturated monomer is styrene.

6. A composition of claim 1 wherein said polyol polyurethane precursor is selected from the group consisting of aliphatic and aromatic diols and triols.

7. A composition of claim 1 wherein said polyol polyurethane precursor is selected fom the group consisting of polyethers of aromatic diols which are condensation products of 1 mol of diol with 2–16 mols of ethylene or polypropylene oxide.

8. A composition of claim 7 wherein said polyol polyurethane precursor is selected from polyoxypropylene (2-16) bisphenol A compounds.

9. A composition of claim 1 which comprises a catalyst which promotes the reaction of isocyanates to form urethane linkages.

10. A composition of claim 1 further comprising a free-radical activation catalyst.

11. A composition of claim 1 further comprising an amount of polyisocyanate wherein the mol ratio of —NCO groups on said polyisocyanate to said hydroxyl groups on said polyol ranges from 0.4/1 to 1.6/1.

12. A composition of claim 11 wherein said polyisocyanate is selected form the group consisting of 4,4'-diphenylmethane diisocyanate, 2,4- and 2,6-toluene diisocyanate and mixtures thereof, isophorone diisocyanates, 4,4'-dicyclohexyl methane diisocyanate, polymethylene polyphenyl isocyanates having 2–6 isocyanate groups per molecule and mixtures thereof.

13. A composition of claim 12 wherein said polyisocyanate has an average of 2.7 isocyanate groups per mol and said isocyanate/hydroxy mol ratio is 0.4/1–1.6/1.

14. A composition of claim 11 comprising a reinforcing filler.

15. A composition of claim 14 wherein said reinforcing filler is selected from the group consisting of glass fibers, graphite fibers, asbestos fibers, and fibers derived from organic polymers, said fibers ranging in size from fibrides to continuous filaments.

16. A handleable, tractable composition made by permitting the composition of claim 11 to thicken by the formation of polyurethanes.

17. A fully-cured intractable composition made by the process of shaping a composition of claim 16 and thereafter copolymerizing said ethylenically unsaturated monomer with said vinyl ester urethane resin by free-radical activation.

18. A resin blend of claim 1 comprising 40–50% by weight of vinyl ester urethane derived from polyoxypropylene (2.2) bisphenol A, maleic anhydride and hydroxypropyl methacrylate, and a polyisocyanate selected from the group consists of toluene disocyanate and polymethylene polyphenyl isocyanate having 2–3 —NCO groups per mol, 40–60% by weight styrene, minor amount of a stabilizer selected from the group consisting of hydroquinone, parabenzoquinone, toluhydroquinone, phenothiazine, 2.5–5% by weight polyoxypropylene (2.2) bisphenol A and catalytic amounts of a catalyst selected from the group consisting of triethylamine, polyoxypropylene (3) polyoxyethylene (1) ethylene diamine and dibutyl tin dilaurate.

19. A composition of claim 18 which comprises 4–6% by weight of polymethylene polyphenyl isocyanate having an average of 2.7-NCO groups per mol for each part of said resin blend.

20. A composition comprising 50–80% by weight of a glass fiber reinforcing filler and a resin blend of claim 18.

21. A composition of claim 19 comprising a free-radical activation catalyst.

* * * * *

UNITED STATES PATENT AND TRADEMARK OFFICE
CERTIFICATE OF CORRECTION

PATENT NO. : 4,287,116
DATED : September 1, 1981
INVENTOR(S) : Joseph P. Burns

It is certified that error appears in the above—identified patent and that said Letters Patent is hereby corrected as shown below:

Column 12, Table I - Preparation J-50% Styrene, Ex. 4 - "80" should read --90--.

Signed and Sealed this

Tenth Day of November 1981

[SEAL]

Attest:

GERALD J. MOSSINGHOFF

Attesting Officer   Commissioner of Patents and Trademarks